United States Patent Office 3,480,517
Patented Nov. 25, 1969

3,480,517
PURIFICATION OF NITROETHANE BY AZEOTROPIC DISTILLATION WITH n-HEPTANE OR ISOOCTANE
John B. Tindall, Terre Haute, Ind., assignor to Commercial Solvents Corporation, New York, N.Y., a corporation of Maryland
No Drawing. Filed Aug. 26, 1968, Ser. No. 755,430
Int. Cl. B01d 3/36; C07c 79/14
U.S. Cl. 203—70                           4 Claims

ABSTRACT OF THE DISCLOSURE

A process for the purification of nitroethane in a mixture with nitromethane and/or higher nitroalkanes by conducing an azeotropic distillation with n-heptane or isooctane to separate the nitromethane and nitroethane from residual higher nitroalkanes then redistilling to separate the nitromethane and hydrocarbon from the nitroethane.

BACKGROUND OF THE INVENTION

This invention relates to the purification of nitroethane. In a particular aspect, this invention relates to the separation of nitroethane from a mixture with other nitroalkanes.

In the production of nitroalkanes by the vapor phase nitration of propane, four nitroalkanes are obtained in quantity, namely, nitromethanet (NM), nitroethane (NE), 2-nitropropane (2-NP) and 1-nitropropane (1-NP), plus small amounts of nitrobutanes. These nitroalkanes are separated by fractionation. At atmospheric pressure, nitromethane is first distilled at about 101° C., then nitroethane at about 114° C., 2-NP at about 120° C. and 1-NP at about 131° C. Commercial grade nitroethane obtained by this process analyzes 99% by weight or more of total nitroalkane, but the purity may be as low as about 90%, the remainder being nitromethane and 2-nitropropane. Prior to distillation nitroethane is present in the production stream in the least volume of all nitroalkanes and 2-NP in the greatest volume. With only 6° difference in boiling point between the two, it is difficult to obtain a high yield of NE relatively free from 2-NP. For example, it has been calculated that to achieve good separation of NE and 2-NP at a 25:1 reflux ratio, a column of 110 theoretical plates would be required. Thus, for a large commercial installation it is impractical to distill nitroethane to a high degree of purity. The present commercial grade purity is satisfactory for many uses but in some, such as in making derivatives, it is desirable to be able to prepare nitroethane in a relatively high degree of purity.

SUMMARY OF THE INVENTION

It is an object of this invention to provide a process for the purification of nitroethane.

Another object of this invention is to provide a method for the separation of nitroethane from a mixture with other nitroalkanes.

Other objects of this invention will be apparent to those skilled in the art from the description herein.

A process has been discovered for the separation of nitroethane in high purity from a nitroalkane mixture, e.g. nitromethane and higher molecular weight nitroalkanes. The new process is 2-stage distillation process. In the first stage, an aliphatic hydrocarbon having from 7 to 8 carbon atoms is added to the nitroalkane mixture and the mixture is distilled. The nitromethane, if any, and nitroethane are separated by distillation and the higher nitroalkanes remain in the residue. The distillate is condensed and collected forming two immiscible layers. The upper layer, which is principally hydrocarbon, is returned to the column and the lower layer, which consists of the nitroethane, nitromethane and some hydrocarbon, is redistilled in a second stage distillation to remove the hydrocarbon-nitromethane azeotrope and excess hydrocarbon. The nitroethane is obtained as a high purity residue.

DETAILED DISCUSSION

According to the new process of the present invention, nitroethane in a mixture with other nitroalkanes, e.g. nitromethane, the nitropropanes, and higher molecular weight nitroalkanes, as impurities is charged to a first distillation unit equipped with a distillation column, a condenser and a decanter head. The hydrocarbon is charged to the kettle in an amount equal to about 20–30%, preferably 25%, by weight, of the nitroethane.

Distillation is begun and the condensed distillate is collected at total take-off in the decanter head where it divides into 2 layers. The upper layer consists of about 88–90% hydrocarbon and 10–12% nitroethane and is returned to the column. The lower layer consists of nitroethane with about 17–20% of hydrocarbon and the nitromethane. The distillation is continued until the vapor temperature starts to rise. The residue is principally hydrocarbon and higher nitroalkanes, e.g. 2-nitropropane, which advantageously may be recovered.

The lower layer is then redistilled in a second distillation unit until the liquid temperature reaches the boiling point of nitroethane (114° C. at 760 mm. pressure). The distillate consists of the nitromethane, if any, and hydrocarbon and the residue is high purity nitroethane.

It is contemplated that the process of the present invention will be employed with commercial grade nitroethane as the starting material, but it is apparent that the process is suitable for any nitroalkane mixture containing nitroethane, including the production stream.

The aliphatic hydrocarbons useful in the practice of this invention include the saturated $C_7$–$C_8$ hydrocarbons and mixtures thereof including the isomers. The preferred hydrocarbons are n-heptane and isooctane. They are commercially available and the commercial grade materials are suitable. Isooctane generally consists of a mixture of 2,2,4-trimethylpentane and 2,2,3-trimethylpentane. The process can be operated with the mixture or with either component as is set forth in the examples.

The process has been described in terms of batch distillations, but it will be readily apparent to those skilled in the art that the process can be easily adapted to continuous operation.

Generally, the process will be operated at atmospheric pressure, but it is also operable at reduced pressures and correspondingly reduced temperatures. Such operation is deemed to be the equivalent of that at atmospheric pressure.

The following examples further illustrate the practice of this invention but it is not intended that the process be limited thereby.

EXAMPLE 1

A mixture of 510 g. of nitroethane, having 6.8% wt., 2-nitropropane and 0.7% nitromethane, and 264 g. of heptane was distilled through a ¾" x 47" column packed with ⅛" single-turn glass helices (estimated equivalent to about 17 theoretical plates). The mixture was distilled at total take-off until the vapor temperature rose to 91° C. at which point distillation was discontinued. The distillate was collected in a 75 ml. decanter set to take off the lower layer and return the upper layer to the column.

The lower layer was redistilled through a ¾" x 24" column packed with 0.16 inch protruded stainless steel equivalent to about 15 plates. The column was equipped with an automatic still head. The distillation was conducted at a 10:1 reflux ratio until the vapor temperature reached 113° C. The residue was 345 g. of nitroethane analyzing 99.6+% purity.

EXAMPLE 2

A 1384 g. sample of commercial grade nitroethane containing 2.23% 2-nitropropane and 0.09% nitromethane was charged to a distillation flask equipped with a fractionating column ¾" in diameter and 38" in length packed with 0.16 inch protruded stainless steel. It was estimated to be equivalent to about 25 theoretical plates. A 75 ml. decanter from which both the upper and the lower layers could be taken off was used to collect the distillate after condensation.

n-Heptane, 482 g., was added to the flask and heat was applied to initiate distillation. As the lower layer collected it was taken off and the upper layer was returned to the column. When the vapor temperature rose to 91° C., the heat was turned off. The residue consisting of nitroethane, 2-nitropropane and heptane was reserved to be added to a subsequent distillation. The lower layer in the decanter, 1596 g., containing 84% NE and 16% heptane with no detectable nitrometrane or 2-nitropropane was redistilled through a ¾" x 47" column packed with ⅛" single-turn glass helices, about 17 theoretical plates. The distillate was collected in a decanter, returning the lower (NE) layer. The distillation was conducted at 89–100° C. vapor temperature. The upper layer consisted of 290 g., analyzing 90% by wt. heptane and 10% nitroethane. It was reserved for a subsequent distillation.

Distillation was continued until the vapor temperature reached 114° C. The residue consisted of nitroethane having a purity of 99.8% and 0.1% each of nitromethane and 2-nitropropane.

EXAMPLE 3

A 1150 g. sample of commercial grade nitroethane containing 3.5% 2-nitropropane and 1.2% nitromethane was mixed with the upper layer reserved from the experiment of Example 2 and analyzing 90% heptane and 10% nitroethane. The distillation was conducted in a similar manner to that of Example 1, using the same equipment. The distillation was continued until the vapor temperature rose above 91° C. at which time distillation was discontinued.

The collected lower layer, consisting of nitroethane, nitromethane and heptane was redistilled according to the procedure of Example 1 to a vapor temperature of 113° C. The residue, 945 g., analyzed 99.3% nitroethane, 0.2% 2-nitropropane and 0.6% nitromethane.

EXAMPLE 4

A sample of nitroethane, 310 g., identical with that of Example 1, was mixed with commercial isooctane, 164 g., analyzing approximately 1:1 2,3,4-trimethylpentane and 2,2,4-trimethylpentane. The same column as used for Example 1 was employed, but the decanter was of 15 ml. capacity which returned the upper layer and was set to take off the lower layer.

The distillation was carried to a vapor temperature of 92° C. and a cut was made. The distillation was continued to 99° C. for the second cut.

The first cut was redistilled at a 10:1 reflux ratio through the 24" column equipped with the automatic still head until a vapor temperature of 113° C. was reached. The residue was nitroethane 99.8%, having 0.2% nitromethane.

The second cut was similarly redistilled leaving a residue of nitroethane 99%, 2-nitropropane, 0.7% and nitromethane 0.1%.

EXAMPLE 5

The experiment of Example 4 was repeated using 150 g. nitroethane and 78.5 g. of 2,3,4-trimethylpentane. The distillation was conducted to a vapor temperature of 98° C. The lower layer was collected and redistilled to a vapor temperature of 113° C. The residue was nitroethane 99.8%, 2-nitropropane 0.1%, and had a trace of nitromethane.

EXAMPLE 6

The experiment of Example 5 was repeated except that 2,2,4-trimethylpentane was substituted for the 2,3,4-isomer and the first distillation was discontinued at 91° C. The lower layer was collected, redistilled to a vapor temperature of 113° C., leaving a residue of nitroethane 99.7%, nitromethane 0.2% and 2-nitropropane 0.1%.

I claim:
1. A process for the purification of nitroethane from a mixture with one or more other nitroalkanes, including nitromethane and 2-nitropropane, comprising the steps of
   (a) mixing the said nitroalkane mixture with an aliphatic hydrocarbon having 7 to 8 carbon atoms,
   (b) distilling said mixture to form a distillate consisting of an upper layer and a lower layer thereby separating said nitroethane, nitromethane and said hydrocarbon,
   (c) returning said upper layer to said distillation step,
   (d) redistilling said lower layer until separation of said nitromethane and said hydrocarbon has been effected, thereby producing, as a distillation residue, purified nitroethane.

2. The method of claim 1 wherein the hydrocarbon is n-heptane.

3. The method of claim 1 wherein the hydrocarbon is 2,2,4-trimethylpentane.

4. The method of claim 1 wherein the hydrocarbon is 2,3,4-trimethylpentane.

References Cited

UNITED STATES PATENTS

| | | | |
|---|---|---|---|
| 2,465,959 | 3/1949 | Tindall | 203—70 |
| 2,597,027 | 5/1952 | Passino et al. | 260—644 |
| 3,211,630 | 10/1965 | Tindall | 260—644 |

WILBUR L. BASCOMB, Jr., Primary Examiner

U.S. Cl. X.R.

203—81, 82; 260—644